United States Patent [19]

Nagasawa et al.

[11] 3,856,627

[45] Dec. 24, 1974

[54] CULTURE MEDIUM FOR BACTERIA

[75] Inventors: Taro Nagasawa; Kozo Hamada; Hiroya Yuguchi; Kenji Mizuguchi, all of Tokyo, Japan

[73] Assignee: Morinaga Milk Industry Co., Ltd.

[22] Filed: May 7, 1973

[21] Appl. No.: 357,922

[30] Foreign Application Priority Data
Dec. 11, 1972 Japan.............................. 47-124123

[52] U.S. Cl. ............................................... 195/100
[51] Int. Cl. .............................................. C12k 1/10
[58] Field of Search ............ 195/99, 100, 101, 102, 195/29; 426/7, 56, 364

[56] References Cited
UNITED STATES PATENTS

| 3,293,140 | 12/1966 | Henry | 426/56 X |
| 3,697,285 | 10/1972 | Faith et al. | 426/7 |
| 3,798,126 | 3/1974 | Gasser et al. | 426/364 X |

*Primary Examiner*—A. Louis Monacell
*Assistant Examiner*—Robert J. Warden
*Attorney, Agent, or Firm*—Oblon, Fisher, Spivak, McClelland & Maier

[57] ABSTRACT

A culture medium containing fish protein hydrolysate which is prepared by hydrolyzing fish protein with protease. This culture medium can be used as a substitute for conventional culture media containing animal organ extracts for bacterial cultivation because of its superior growth enhancing effects, uniformity in quality, convenience and low price.

2 Claims, 4 Drawing Figures

CULTURE MEDIUM FOR BACTERIA

BACKGROUND OF THE INVENTION

1. Field of the Invention

The present invention relates to a culture medium for the cultivation of bacteria. More particularly, the present invention relates to a culture medium for the cultivation of bacteria containing a fish protein hydrolysate which is prepared by hydrolizing fish meat with protease.

2. Description of the Prior Art

Hitherto, heart infusion culture medium (hereinafter abbreviated as HIB culture medium) and brain heart infusion culture medium (hereinafter abbreviated as BHI culture medium), and the like have been widely employed as culture media for the cultivation of bacteria in research and clinical laboratories concerned with medical research and for the detection of bacteria in the inspection rooms of hospitals. These culture media should be fortified with animal body fluids such as blood and serum for the cultivation of bacteria in order to maintain strict nutritional levels for the growth of the bacteria. However, the HIB and BHI culture media have the disadvantages that the animal organs employed for the preparation of the infused bouillon are difficult to obtain and it is difficult to achieve culture uniformity. Further, mass production of the culture media is difficult because of the qualitative fluctuations of beef heart and calf brain, thus increasing the costs of the culture media. Also, operational procedures become more complicated when the culture media are fortified with animal body fluids, thus adding to the costs of the culture media. Because the detection of bacteria is essential for the promotion of human health and the prevention of human diseases, the need for an effective and inexpensive culture medium is an urgent requirement.

SUMMARY OF THE INVENTION

Accordingly, one object of the present invention is to provide a culture medium for the growth of bacteria which consists of an enzymatically-hydrolyzed fish protein.

Another object of the invention is to provide a culture medium which is more convenient for use, more inexpensive in large scale preparations, and more uniform in quality in comparison to conventional culture media.

Briefly, these objects and other objects of this invention as hereinafter will become readily apparent can be achieved by providing a culture medium for the cultivation of bacteria which comprises a hydrolysate of fish protein prepared by hydrolyzing more than 80% of fish protein with protease to achieve a concentration greater than 0.5% (W/V) therein.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
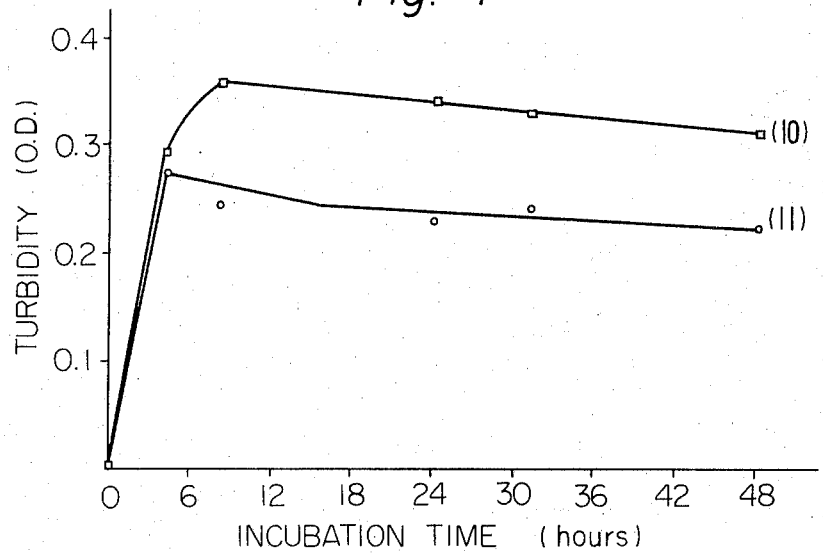
FIG. 1 shows the growth curves for Diplococcus pneumoniae in the FLP-1 (10) and BHI (11) culture media as expressed in terms of the turbidity of the culture media.

In the present invention, the term bacteria includes those bacteria which are cultured for research and clinical inspection in medical research laboratories and in the bacterial inspection rooms of hospitals. The preparation of a dried product of the hydrolysate of fish protein (hereinafter referred to as "a dried product"), is described as follows.

Suitable sources of fish which are useful as the raw material of this invention include tuna, bonito, cod, shark, mackerel, sardine, horse mackerel, mackerel pike, and the like. Any parts of the bodies of these fish can be used as well as whale meat.

When a dried product is desired as an ingredient for culture media, fresh fish meat or fish meat frozen immediately after capture of the fish is used as the raw material since it is undesirable to use fish meat which has an odor or is colored. If fish are used which are not fresh, the resulting hydrolysate of the fish protein should be treated with activated charcoal or an ion-exchange resin by conventional means. The fish meat is then ground, dispersed in tepid water and subjected to enzymatic treatment.

Suitable protease useful for hydrolizing fish protein include pancreatin and enzymes derived from Aspergillus, Bacillus, Streptomyces, and Rhizopus. These materials exhibit optimum activity near a pH of 7, and the reaction temperature is preferably from 35° to 55°C. This temperature range is optimum for protease activity although the optimum activity is dependent upon the species of protease used. The amount of protease used varies depending upon the degree of autolysis of the fish, the specific activity of the protease and the duration of the hydrolysis. The amount of protease usually ranges from 0.1 to 0.6% (W/V) based on the quantity of raw material used. The duration of the hydrolysis reaction is usually from 1 to 6 hours. However, it is usually desirable to terminate the hydrolysis reaction within 1 hour when fish are used which have been exposed to long-term storage. This is necessary because these fish may deteriorate by bacterial contamination when the reaction period exceeds 6 hours. Enzymatically-hydrolyzed fish protein is obtained as a liquid after the enzyme treatment containing 9 to 16% solid matter. About 90% of this solid matter is composed of proteins, peptides, amino acids, and the like. The yield of the liquified protein which is employed as the raw material contains 80 to 90% of the fish protein. The hydrolysis reaction is terminated when the amount of 10% trichloroacetic acid soluble nitrogen (which hereinafter denotes the degree of hydrolysis) exceeds 80% of the total amount of nitrogen in the reaction mixture although the rate of hydrolysis is varied depending upon the substrate species and the enzyme used, because the yield of liquified fish protein is insufficient when the degree of hydrolysis as determined by the above procedure, is less than 80%. Immediately after the hydrolysis reaction is terminated, the hydrolysate is heated to 80°C for 10 minutes in order to deactivate the enzyme and to simultaneously pasteurize the reaction mixture. The hydrolysate, after it has been pasteurized, is filtered through a 30 to 40 mesh stainless steel sieve and centrifuged to remove fat and insoluble materials contained in the hydrolysate liquid. Then, the liquid is concentrated and dried by any conventional manner to a dried product.

For the purpose of studying the effect of this dried product on the growth of bacteria, a comparative study was first performed on the growth of Diplococcus pneumoniae which is one of the bacteria which causes pneumonia in the culture medium of this invention and in a BHI culture medium which maintains the strict nutritional requirements needed for the growth of the bacteria. The BHI culture medium was prepared by adding calf brain, beef heart extract, and peptone to a mixture containing dextrose and $K_2HPO_4$ with the pH conditions shown in Table I. The comparative fish hydrolysate composition (hereinafter designated as the FLP-1 culture medium) was prepared under conditions similar to those of the BHI culture medium as shown in Table I.

TABLE I

A Comparison of the FLP-1 and BHI Culture Media Used for Culturing Diplococcus Pneumoniae

| FLP-1 culture medium | | BHI culture medium | |
| --- | --- | --- | --- |
| Dried fish protein hydrolysate | 30.0 g | Extract infused from calf brain | 200 ml |
| Sodium chloride | 5.0 g | Extract infused from beef heart | 250 ml |
| | | Peptone | 10.0 g |
| Dextrose | 2.0 g | Dextrose | 2.0 g |
| Dipotassium phosphate | 2.5 g | Dipotassium phosphate | 2.5 g |
| pH | 7.0 | pH | 7.0 |
| Distilled water to | 1 liter | Distilled water to | 1 liter |

The composition and the pH of the culture media used for culturing Diplococcus pneumoniae are shown in Table I. The bacteria were cultured by adding 0.5 ml of a bacterial inoculum to 50 ml of each culture medium followed by culturing at 37°C. Growth of the bacterium was conducted by a conventional method and was followed by the degree of turbidity (O.D.) at a wavelength of 660 mu. The results are shown in FIG. 1. The turbidity of the medium as the ordinate is expressed as a function of the incubation period on the abscissa, wherein (10) is the growth curve for the bacterium in the FLP-1 culture medium and (11) is the growth curve for the bacterium in the BHI culture medium. It is evident from these results that the FLP-1 culture medium exhibits a remarkable effect on the growth of the bacteria to an extent substantially greater than the BHI culture medium.

Similar experiments were conducted with the Salmonella paratyphi B bacterium in the two culture media. The Salmonella bacterium used causes B type paratyphus, and is infectious in man and animals. The nutritional requirements are not as strict for the Salmonella bacterium as they are for Diplococcuus pneumoniae. The composition and the pH of the culture media used for culturing Salmonella paratyphi B are compared and tabulated in Table II.

TABLE II

A Comparison of the FLP-2 and HIB Culture Media Used For Culturing Salmonella Paratyphi B

| FLP-2 culture medium | | HIB culture medium | |
| --- | --- | --- | --- |
| Dried fish protein hydrolysate | 30.0 g | Extract infused from beef heart | 500 ml |
| | | Peptone | 10.0 g |
| Sodium chloride | 5.0 g | Sodium chloride | 5.0 g |
| pH | 7.2 | pH | 7.2 |
| Distilled water to | 1 liter | Distilled water to | 1 liter |

Figure 2:
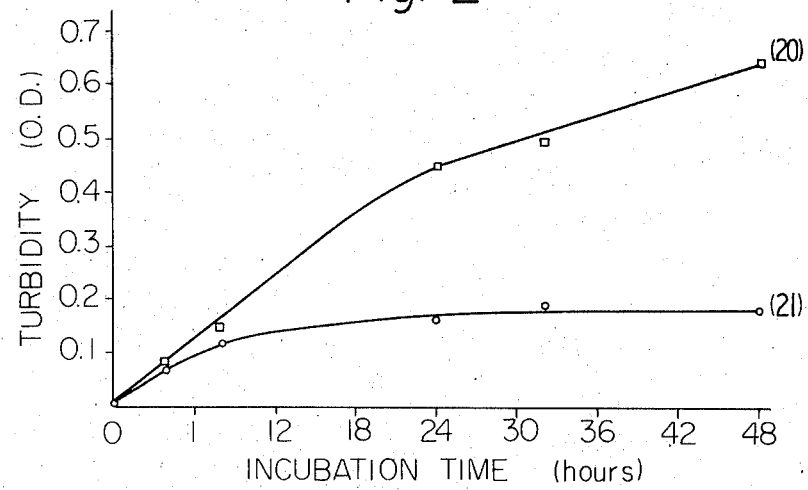
FIG. 2 shows the growth curves for Salmonella paratyphi B in the FLP-2 (20) and HIB (21) culture media as expressed in terms of the turbidity of the culture media.

The experimental results from the experiments with Salmonella paratyphi B are shown in FIG. 2, wherein (20) is the growth curve for Salmonella paratyphi B in the FLP-2 culture medium and (21) is the growth curve obtained from the HIB culture medium. The plots in FIG. 2 show that the FLP-2 culture medium is superior to the HIB culture medium for the growth of bacteria.

The increases in turbidity of the media employed was used as an index for bacterial growth throughout these experiments. This procedure was used as the method of analysis because of the observation that increases in the turbidity of the media innoculated with bacteria correlates directly with the increase in the viable cell count of the bacteria. This observation led to the conclusion that the turbidity of bacterial cultures can be used as an index for bacterial proliferation.

Experiments were conducted to determine the concentration range of the fish hydrolysate of this invention which should be added to the culture medium. The test were conducted as follows.

Culture media were prepared by substituting the calf brain extract, the beef heart extract and peptone in the BHI culture medium with the dried fish hydrolysate in concentrations of 5, 3, 1 and 0.5% (W/V) of the fish hydrolysate in the culture. Streptococcus faecalis was then cultured in this series of cultures. Similarly, a series of culture media were prepared by substituting beef heart extract and peptone in the HIB culture medium with the dried fish hydrolysate in concentrations of 5, 3, 1 and 0.5% (W/V) of the fish hydrolysate in the culture. Shigella sonnei was then cultured in this series of cultures. In addition, Str. faecalis and Sh. sonnei were cultured by the same method described above for the Diplococcus and Salmonella bacteria, and were tested.

Figure 3:
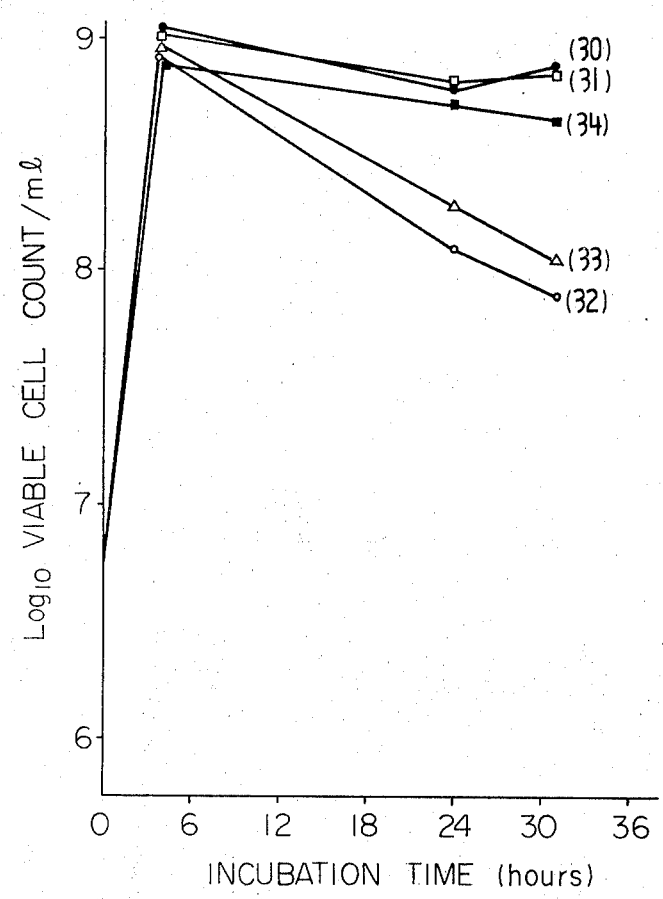
FIG. 3 shows the growth curves for Streptococcus faecalis versus incubation time as a function of varying concentrations of the dried fish product in the culture media.
Figure 4:
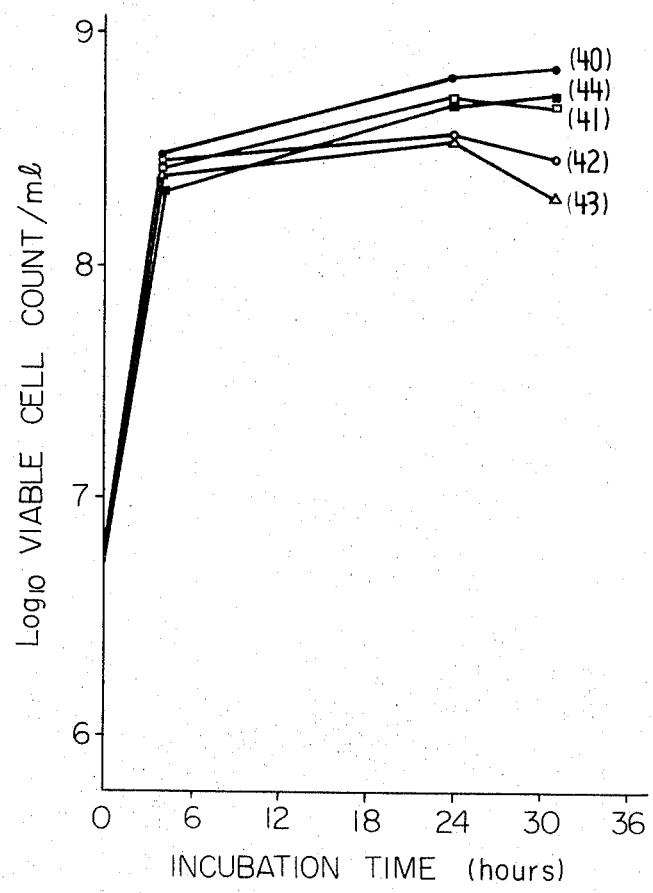
FIG. 4 shows the growth curves for Shigella sonnei versus incubation time as a function of varying concentrations of the dried fish product in the culture media.

The experimental results are shown in FIGS. 3 and 4. FIG. 3 shows a series of growth curves for Str. faecalis in the culture media which contains the dried product in concentrations of 5, 3, 1 and 0.5% (W/V). Each culture media further contained 0.5% (W/V) sodium chloride, 0.2% (W/V) dextrose and 0.25% (W/V) dipotassium phosphate. The pH of each solution was adjusted to 7.0. The concentration of bacteria in the modified BHI culture medium is expressed as the viable count of bacterial cells. FIG. 4 shows the growth curves obtained for Sh. sonnei in the culture media which contain the dried fish product in concentrations of 5, 3, 1 and 0.5% (W/V). Each culture media was further modified with 0.5% (W/V) sodium chloride and were adjusted to a pH of 7.2. The concentration of bacteria in the modified HIB culture medium is expressed as the viable count of bacterial cells. In each figure, the ordinate and the abscissa show the viable count of bacterial cells and the incubation time, respectively. In the figures, the coorrelation between fish product concentration and the growth curves of the bacteria in the culture media of this invention are as follows: 30 and 40 = 5%, 31 and 41 = 3%, 32 and 42 = 1% and 33 and 43 = 0.5% (W/V). 34 and 44 represent the growth curves of bacteria in the unmodified BHI and HIB culture media.

From the results of these experiments, it has been concluded that there is very little difference between the culture of this invention and the BHI and HIB culture media. In media containing the fish product in concentrations less than 0.5% (W/V) the number of viable bacterial cells rapidly decreases during incubation over substantial periods of time. However, the bacteria exhibit a satisfactory proliferation in the media which contain concentrations of the fish product from 0.5 to 3%. The proliferation profile of the bacteria in the culture media containing concentrations of fish product greater than 3%, is similar to the result from the media having a concentration of 3%. The test results indicate that the most desirable concentration of the fish product should range from 0.5 to 3% (W/V) in the culture media.

A comparative study concerning the bacterial growth of bacterial species other than the bacteria described above in the culture media containing the product of the invention, which have been commonly and frequently detected and cultured in medical science laboratories and bacterial inspection rooms of hospitals, was conducted. The results of this study are expressed in terms of the relative turbidities of the FLP-1 culture medium to the BHI culture medium and of the FLP-2 culture medium to the HIB culture medium at 8, 24, and 48 hours incubation in Tables III and IV respectively.

TABLE III

A Comparison of the Growth of Bacteria in FLP-1 Culture Medium to the BHI culture Medium

| Bacterium | Relative bacterial turbidity of the FLP-1 culture medium compared to the BHI culture medium | |
|---|---|---|
| | After 8 hours incubation (%) | After 24 hours incubation (%) |
| Lysteria monocytogenes | 84 | 100 |
| Corynebacterium diphtheriae | 143 | 84 |
| Streptococcus faecalis | 109 | 112 |
| Streptococcus hemolyticus | 92 | 105 |
| Streptococcus viridans | 194 | 103 |
| Bacteroides fragilis | — | 281* |
| Diplococcus pneumoniae | 148 | 143 |

Note (1) The compostions of the FLP-1 and the BHI culture media are the same as in Table I.
(2) * shows the value obtained after culturing the bacterium for 48 hours.

TABLE IV

A comparison of the Growth of Bacteria in the FLP-2 Culture Medium to the HIB Culture Medium

| Bacterium | Relative bacterial turbidity of the FLP-2 culture medium compared to the HIB culture medium | |
|---|---|---|
| | After 8 hours incubation (%) | After 24 hours incubation (%) |
| Shigella dysenteriae | 115 | 113 |
| Shigella flexneri | 117 | 148 |
| Shigella boydii | 152 | 135 |
| Shigella sonnei | 108 | 100 |
| Bacillus subtilis | 105 | 106 |
| Staphylococcus aureus | 53 | 184 |
| Staphylococcus sp. * | 95 | 76 |
| Staphylococcus epidermidis | 66 | 82 |
| Escherichia coli B ** | 160 | 98 |
| Escherichia coli $O_{124}$*** | 105 | 116 |

TABLE IV-Continued

A comparison of the Growth of Bacteria in the FLP-2 Culture Medium to the HIB Culture Medium

| Bacterium | Relative bacterial turbidity of the FLP-2 culture medium compared to the HIB culture medium | |
|---|---|---|
| | After 8 hours incubation (%) | After 24 hours incubation (%) |
| Pseudomonas aeruginosa | 181 | 170 |
| Serratia marcescens | 67 | 108 |
| Aeromonas hydrophila | 86 | 90 |
| Salmonella typhi | 90 | 103 |
| Salmonella paratyphi A | 126 | 127 |
| Salmonella paratyphi B | 124 | 277 |
| Salmonella typhimurium | 133 | 126 |
| Salmonella enteritidis | 126 | 114 |
| Proteus vulgaris | 135 | 143 |
| Proteus mirabilis | 150 | 130 |
| Proteus morganii | 160 | 149 |

Note:
(1) The compositions of the FLP-2 and HIB culture media are the same as in Table II;
(2) * shows a bacterium which decomposes mannit and which has no coagulation activity;
(3) ** shows a non-pathogenic type of Escherichia coli which decomposes lactose;
(4) *** shows a pathogenic type of Escherichia coli which does not decompose lactose.

From the experimental results presented in Tables III and IV, it is evident that *Shigella boydii, Escherichia coli B, Pseudomonas aeruginosa, Salmonella paratyphi A, Salm. paratyphi B, Salm. enteritidis, Salm. typhimurium, Proteus vulgaris, P. mirabilis, P. morganii, Corynebacterium diphtheriae, Streptococcus viridans* and *Diplococcus pneumoniae*, and the like show excellent growth in media containing the dried fish product of the invention after culturing for 8 hours.

The growth of *Shigella flexneri, Sh. boydii, Staphylococcus aureus, Pseudomonas aeruginosa, Salmonella paratyphi A, Salm. paratyphi B, Salm. typhimurium, Proteus vulgaris, P. mirabilis, P. morganii* and *Diplococcus pneumoniae*, and *Bacteroides frangilis* in the culture medium of the present invention evidently exceeds the growth of the same bacteria in the HIB and BHI cultures after 24 hours and 48 hours incubation. Bacteria showing about the same relative growth in the present culture medium compared to the conventional media after 8 hours, and 24 hours incubation are *Shigella dysenteriae, Sh. flexneri, Sh. sonnei, Staphylococcus sp., Escherichia coli $O_{124}$, Aeromonas hydrophila, Salmonella typhi, Bacillus subtilis, Listeria monocytogenes, Streptococcus faecalis* and *Str. Hemolyticus*, and *Shigella dysenteriae, Staphylococcus epidermidis, Escherichia coli B, E. coli $O_{124}$, Serratia marcescens, Shigella sonnei, Aeromonas hydrophila, Salmonella typhi, Salm. enteritidis, Listeria monocytogenes, Corynebacterium diphtheriae, Streptococcus hemolyticus, Str. faecalis, Str. viridans* and *Bacillus subtilis*. No bacteria have been found which have a much lower growth rate in the medium of the present invention compared to the conventional BHI and HIB culture media.

The fact that bacteria show a high relative turbidity after 8 hours incubation in the present culture medium compared to the conventional BHI and HIB culture media as shown in Tables III and IV presents strong evidence for the conclusion that bacterial growth is promoted by the present culture medium, and that the culturing time required for detection of each bacterium may be shortened. In the instances where bacteria show a profoundly greater growth when incubated in the present culture medium compared to the conventional culture media, the media containing a growth promoting animal body fluid such as blood and serum can be substituted by the inexpensive medium of the present invention.

Bacteria which can be cultured in the fish hydrolysate culture medium include species of Shigella, Salmonella, Proteus. Staphylococcus and Streptococcus, and *Diplococcus pneumoniae, Escherichia coli, Serratia marcescens, Aeromonas hydrophila, Bacteroides fragilis, Pseudomonas aeruginosa, Listeria monocytogenes, Corynebacterium dyphtheriae* and *Bacillus subtilits*, and the like. The concentration of sodium chloride which is required in the fish hydrolysate culture medium is approximately 0.5% (W/V) which is similar to the amount required in the conventional culture media. When bacteria such as Streptococcus, Diplococcus and the like are cultured, which require rigid nutritional levels, glucose and dipotassium phosphate should be added to the media although considerable growth is achieved despite the absence of the additives.

When the preservation of strains of bacteria, determination of the viable count of bacterial cells, sensitivity tests to antibiotics, isolation, identification, and the like are required, the present culture medium may be solidified by adding agar in amounts typically used to solidify conventional culture media.

When the fish hydrolysate medium is used to culture a bacterium, it is sterilized by conventional methods and adjusted to a pH of 7.2 ± 0.2. The culture is then inoculated with the desired bacterium and is cultured at a temperature optimum for the growth of the bacterium for an appropriate time.

The culture medium of the present invention is suitable for mass production and is qualitatively more stable and uniform than the conventional culture media since fish which are employed for the preparation of the culture medium of this invention are inexpensive and can be supplied in large quantities. In addition, expensive animal organ extracts, blood serum, and the like are not required in the formulation of the culture medium since it provides excellent growth effects for many kinds of bacteria in comparison to the HIB and BHI culture media. Moreover, the incubation time which is required for the detection of the bacteria is shortened.

Having generally described this invention, a further understanding can be obtained by reference to certain specific examples which are provided herein for purpose of illustration only and are not intended to be limiting unless otherwise specified.

EXAMPLE 1

Five hundred grams of mackerel were chopped with a chopper and placed in a hydrolizing vessel, and the same quantity of water was added thereto. After the mixture was heated to 50°C, protease prepared from *Streptomyces griseus* (50,000 [PU] Cas. F.R.B.γ tyr) was added to the vessel in an amount equivalent to 0.6% of the raw material, and the enzymatic hydrolysis was conducted at 50°C for 4 hours. Thereafter, the hydrolized liquid was heated to 80°C and then was allowed to stand at this temperature for 10 minutes to inactivate the enzyme.

After filtering the hydrolysate through a 30 to 40 mesh stainless steel sieve, the hydrolysate was centrifuged in a Sharples centrifuge to remove the fat and insoluble matter to yield 930 g of liquid enzymatically-hydrolized fish protein of which the protein content was 8.85%. The degree of hydrolysis of the fish protein liquid was 95%. The supernatant fraction was concentrated to a solids content of 35% with an evaporator, and then spray-dried to yield 82 g of dried fish hydrolysate. An FLP-2 culture medium having the composition shown in Table II was prepared using this dried product.

Samples of FLP-2 and HIB culture media were each placed in a 100 ml flask, and were sterilized at 121°C for 15 minutes. The culture media were inoculated with 0.5 ml of the inoculum of *Proteus vulgaris* in Tryptosoya broth and incubated at 37°C for 48 hours. At predetermined intervals of time, a 2 ml portion of each fluid culture medium was withdrawn and subjected to a turbidity determination at a wavelength of 660 m$\mu$, which was expressed in terms of optical density (O.D.). This test established the relative degree of bacterial growth in the two media.

The values obtained after 24 hours and 48 hours growth for *Proteus vulgaris* in the FLP-2 culture medium were 0.78 and 1.00 respectively. However, the values obtained were 0.54 and 0.70 respectively for the HIB culture medium. These values are significantly less than the values obtained for the growth of the bacterium in the FLP-2 culture medium. It is evident from these results that the present culture medium is an excellent medium for the growth of bacteria.

EXAMPLE 2

The FLP-1 culture medium having the composition shown in Table I was prepared using the dried fish product obtained by the procedure described in Example 1. Ten ml portions of the FLP-1 medium and the BHI culture medium were placed in 6 test tubes respectively and sterilized at 121°C for 15 minutes. 0.1 ml samples of the inoculum of *Bacteroides fragilis*, which was obtained by anaerobical incubation in Tryptosoya broth by the conventional method, were inoculated into each test tube, and each tube was anaerobically incubated at 37°C for 48 hours. At fixed intervals of time, 2 ml portions of culture liquid from each tube were withdrawn and subjected to turbidity determinations at a wavelength of 660 mu, and expressed in terms of optical density (O.D.). These tests established the relative degree of bacterial growth in the two media.

The values obtained after 30 hours and 48 hours growth for *Bacteroides fragillis* in the FLP-1 culture medium were 0.05 and 0.30 respectively. However, the values obtained were 0.01 and 0.10 respectively for the BHI culture medium. These values are significantly less than the values obtainable for the growth of the bacterium in the FLP-1 culture medium. It is evident from these results that the present culture medium is an excellent medium for the growth of bacteria.

Having now fully described this invention. it will be apparent to one of ordinary skill in the art that many changes and modifications can be made thereto without departing from the spirit or scope of the invention as set forth herein.

What is claimed as new and intended to be covered by Letters Patent is:

1. The culture medium FLP-1 as a substitute for a brain heart infusion culture medium, prepared by dissolving dried fish protein hydrolysate containing more than 80% hydrolyzed fish protein, sodium chloride, dextrose and dipotassium phosphate in water and adjusting said prepared culture medium at a pH of about 7.0.

2. The culture medium FLP-2 as a substitute for a heart infusion culture medium, prepared by dissolving a dried fish protein hydrolysate containing more than 80% hydrolyzed fish protein and sodium chloride in water and adjusting said prepared culture medium at a pH of about 7.0.

* * * * *

UNITED STATES PATENT OFFICE
CERTIFICATE OF CORRECTION

PATENT NO. : 3,856,627
DATED : December 24, 1974
INVENTOR(S) : TARO NAGASAWA ET AL It is certified that error appears in the above-identified patent and that said Letters Patent are hereby corrected as shown below:

Column 3, Table 1, under "BHI culture medium", insert --Sodium chloride 5.0 g-- between "Pepton 10.0 g" and "Dextrose 2.0 g".

Signed and Sealed this second Day of September 1975

[SEAL]

Attest:

RUTH C. MASON
Attesting Officer

C. MARSHALL DANN
Commissioner of Patents and Trademarks